United States Patent [19]
Rozelle

[11] 3,732,487
[45] May 8, 1973

[54] METHOD AND APPARATUS FOR ELECTRICALLY COUPLING AN OUTPUT VOLTAGE FROM A VARIABLE INDUCTION DEVICE TO LOAD

[75] Inventor: Donald S. Rozelle, Owego, N.Y.

[73] Assignee: Magnetech Industries, Inc., Montrose, Pa.

[22] Filed: Aug. 12, 1971

[21] Appl. No.: 171,206

[52] U.S. Cl. ............................323/54, 336/15, 339/8 A
[51] Int. Cl. ...........................................H01f 21/04
[58] Field of Search ....................323/53, 54; 336/15, 336/79; 339/8 A, 8 R

[56] References Cited

UNITED STATES PATENTS

| | | | |
|---|---|---|---|
| 3,614,692 | 10/1971 | Rozelle et al. | 336/15 |
| 2,993,182 | 7/1961 | Ellis | 336/15 |
| 1,013,108 | 1/1912 | Barr | 323/54 |

Primary Examiner—A. D. Pellinen
Attorney—Robert S. Swecker

[57] ABSTRACT

Apparatus for electrically connecting the output voltage from a movable coil of a variable induction device to an external load. The movable coil is preferably mounted on two spaced, rotatable drums and is linked by a cyclically varying magnetic flux. The resulting output voltage is variable in response to rotation of the drums. A ring and brush arrangement, one of which moves with the movable coil, establishes a current path between the movable coil and the external load through wiping engagement therebetween. The ring is a closed, electrically conductive loop preferably having a predetermined electrical resistance between points spaced circumferentially thereof, and is positioned in flux linking relation to the cyclically varying magnetic flux operatively associated with the movable coil. The electromotive force induced into the ring thereby modifies the output voltage generated by the movable coil in response to rotation of the movable coil providing a highly accurately selectable output voltage.

25 Claims, 4 Drawing Figures

INVENTOR
DONALD S. ROZELLE though in the extensive is a further object of the present invention to pro-
METHOD AND APPARATUS FOR ELECTRICALLY COUPLING AN OUTPUT VOLTAGE FROM A VARIABLE INDUCTION DEVICE TO LOAD

BACKGROUND OF THE INVENTION

This invention relates to a method and apparatus for electrically connecting a movable member to a stationary member, and more specifically relates to a method and apparatus for coupling the output voltage from a movable coil in a variable induction device to an external load.

Among the more common types of variable transformers are the conventional auto transformer and transformers utilizing tap changing systems. These types of variable transformers or variable induction devices are subject to mechanical wear and do not provide a truly continuous output voltage, i.e. the output voltage varies incrementally.

In another type of variable induction device disclosed and claimed in U.S. Pat. No. 3,614,692 to Donald S. Rozelle et al, filed June 2, 1970 and assigned to the assignee of the present invention, a continuously variable output voltage is provided. A movable coil, the turns of which are transferable between two spaced rotatably mounted drums, is linked by a cyclically varying magnetic flux from a primary transformer winding and an output voltage is generated across the movable coil. The effective number of turns and therefore the output voltage of the movable coil may be varied by rotating the drums. Since the coil is movable, a takeoff ring and brush arrangement are utilized to couple the output voltage from the movable coil to an external load.

In variable induction devices of this nature where an electrical circuit must be provided between a rotating coil and an external load, various types of ring and brush arrangements have been utilized. For example, in U.S. Pat. No. 1,004,102 to Storer, the output voltage from the rotating coil is coupled to the external load through a plurality of stationary brushes cooperating with rings which rotate with the coils. The rings are linked by the cyclically varying magnetic flux from the primary winding and therefore the rings are segmented to eliminate a closed current loop in the secondary circuit.

In U.S. Pat. No. 862,361 to Thompson a one-piece electrically conductive ring cooperating with a brush is utilized to couple the output voltage from a rotating coil to an external circuit. However, the ring is positioned outside the magnetic core upon which the variable induction device is mounted. Thus, the cyclically varying magnetic flux produced by the primary winding does not link the ring and therefore no electromotive force (emf) is induced in the ring through transformer coupling between the primary winding and the ring.

Contrary to the teachings of these two patents, it has been found that under certain conditions an emf induced into the ring by the cyclically varying magnetic flux from the primary winding is not only not harmful, but is desirable from the standpoint of output voltage amplitude selectivity.

It is therefore an object of the present invention to provide a novel method and apparatus for coupling the output voltage from a rotating element to a fixed element in a variable induction device.

It is a further object of the present invention to provide a novel method and apparatus for increasing the output voltage amplitude selectivity of a variable induction device.

It is another object of the present invention to provide a novel method and apparatus for coupling the output voltage generated by a cyclically varying magnetic flux linking a movable coil from the movable coil to an external load.

These and other objects and advantages will become apparent to one skilled in the art to which the invention pertains from a perusal of the following detailed description of the invention when read in conjunction with the appended drawings.

THE DRAWINGS

DETAILED DESCRIPTION

Figure 1:
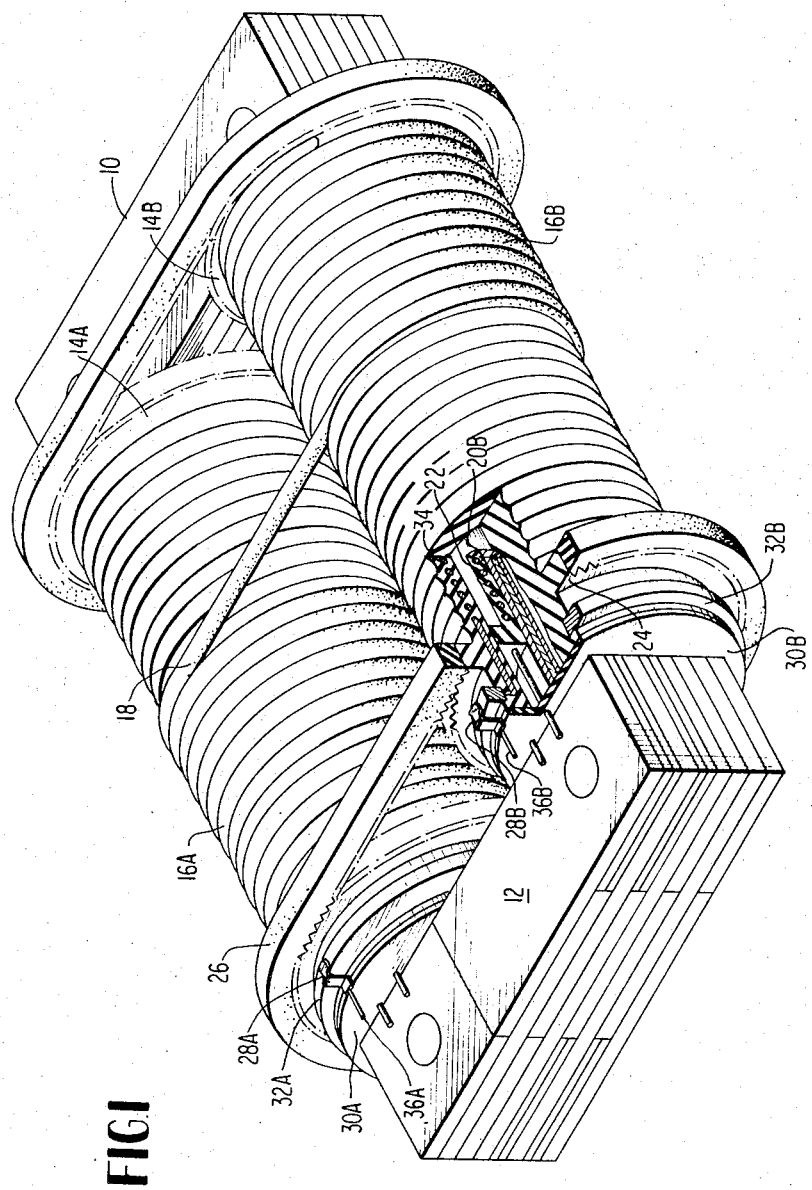
FIG. 1 is a perspective view of a variable induction device showing the voltage coupling apparatus of the present invention.

Referring to FIG. 1, an induction device with which the present invention may be utilized comprises a rectangular laminated core 10 having a removable end member 12, two generally cylindrical substantially hollow drums 14A and 14B carried by opposite legs of the core 10 for axial rotation about the longitudinal axes thereof, two electrically conductive coils 16A and 16B formed by a flexible conductor 18 would about each of the drums 14, and means for simultaneously modifying the number of turns in each of the coils 16.

The drums 14A and 14B are mounted for axial rotation on two cylindrical members 20A (not shown) and 20B, respectively. The cylindrical members 20A and 20B are nonrotatably carried by opposite legs of the core 10 in telescoping relation therewith. A primary transformer winding 22 may be carried by each of the cylindrical members 20A and 20B to provide a means for inducing a cyclically varying magnetic flux which links the coils 16 to generate an output voltage.

Each of the drums 14A and 14B may be provided with flanges 24 cooperable with a timing belt 26, or any other suitable means, for rotating the drums 14 in synchronism. As the drums are rotated, the effective number of secondary turns is modified, thereby varying the output voltage available thereacross. A more detailed description of the above described variable induction device may be had by reference to the previously mentioned Rozelle et al. U.S. Pat. No. 3,614,692, the disclosure of which is hereby incorporated herein by reference.

A ring and brush arrangement is utilized to couple the generated variable voltage to an external load. Electrically conductive contacts or brushes 28A and 28B are preferably nonrotatably carried by opposite legs of the core 10, for example, by mounting the brushes 28A and 28B on nonrotatable, electrically nonconductive end members 30A and 30B, respectively. The brushes 28A and 28B are in wiping engagement with electrically conductive rings 32A and 32B, respectively, which are preferably mounted on the respective drums 14A and 14B for rotation therewith. For example, the rings may be placed into a mold from which the drums are made to obtain the illustrated one-piece construction.

The ring 32A is electrically connected to the end of the coil 16A and the ring 32B is connected to the end of the coil 16B, preferably through a fixed winding 34 embedded in the drum 14B. Conductors 36A and 36B may be provided to electrically connect the rings 32A and 32B to an external circuit or load.

Alternatively, the rings 32A and 32B may be non-rotatably mounted on the core 10 and the brushes rotatably mounted on the drums 14 and electrically connected to the ends of the coils 16 as is disclosed in the previously referenced Rozelle et al. U.S. Pat. No. 3,614,692.

Figure 2:
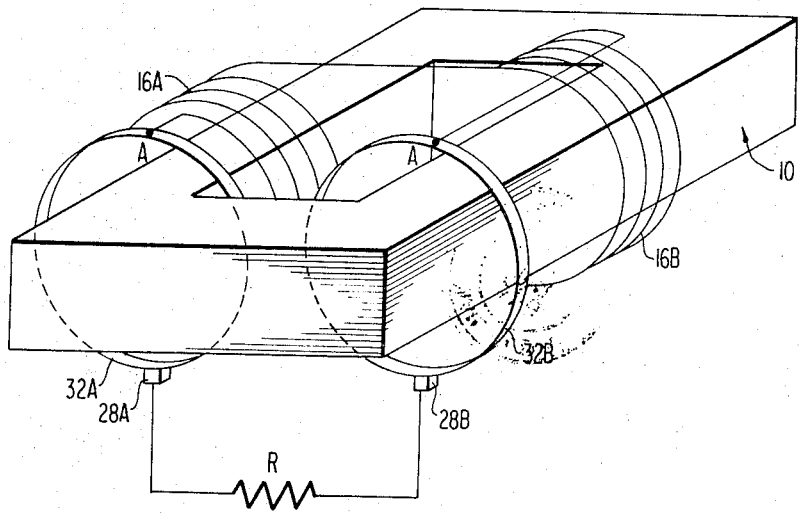
FIG. 2 is a functional illustration of the variable induction device of FIG. 1.

Referring now to FIG. 2, the cyclically varying magnetic flux produced by the primary windings 22, shown in FIG. 1, links the coils 16A and 16B and the rings 32A and 32B. As was previously mentioned, the rings 32A and 32B are each connected at a predetermined point along the circumferences thereof, e.g. point A, to the ends of the coils 16A and 16B respectively. The brushes 28A and 28B are stationary and as the drums and the rings are rotated, the circumferential distance along the rings 32A and 32B between point A and the respective brushes 28A and 28B varies as the drums 14 are rotated. Since the coils 16 are transferred from one drum to the other in response to the drum rotation, this circumferential distance varies as a function of coil movement.

With continued reference to FIG. 2, the total magnetic flux $\psi$ which links the coils 16A and 16B induces an electromotive force in the coils ($emf_c$) which is equal to the rate of change of the magnetic flux with respect to time and may be expressed by the following equation:

$$emf_c = d\psi/dt \qquad (1)$$

Assuming that most of the magnetic flux produced by the primary winding 22 (FIG. 1) links the coils 16A and 16B, i.e. the flux losses are negligible, the electromotive force $emf_c$ may be approximated by the following equation:

$$emf_c = (N_2/N_1)(V_1) \qquad (2)$$

where: $N_2$ is the number of secondary turns;
$N_1$ is the number of primary turns; and,
$V_1$ is the voltage applied to the primary winding.

Assuming, for example, that the primary voltage $V_1$ is 120 volts r.m.s. and the number of primary turns is 360, the voltage $emf_c$ is given by the following equation:

$$emf_c = N_2/3 \qquad (3)$$

Disregarding the effect of the rings 32A and 32B, the output voltage between the brushes 28A and 28B is equal to $emf_c$. By rotating the drums and therefore transferring coil turns between the drums, the output voltage may be varied approximately linearly and approximately continuously throughout a predetermined range. For example, if one full drum revolution effectively increases the number of secondary turns by one, the output voltage calculated using equation (3) above is theoretically increased by one-third of a volt.

While it is possible to obtain fairly accurate voltage selectivity in this manner, it may be extremely difficult to adjust the output voltage from the variable inductor within tolerances of a few millivolts by solely varying the number of effective secondary turns. However, as will hereafter be described in greater detail, the ring and brush arrangement of the present invention provides extremely accurate voltage selectively where tolerances in the millivolt range are required.

Figure 3:
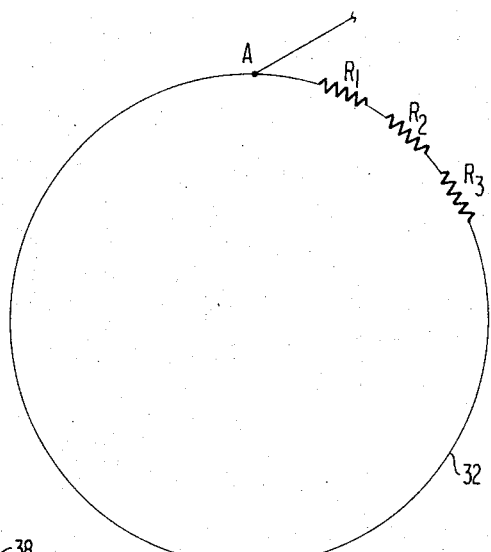
FIG. 3 is a view in elevation functionally illustrating a preferred form of the voltage coupling apparatus of FIG. 1.

With reference now to FIGS. 2 and 3, the rings 32A and 32B each constitutes a one turn secondary winding linked by substantially the same total magnetic flux $\psi$ which links the coils 16A and 16B. The electromotive force induced in each of the rings ($emf_r$) is therefore also equal to the rate of change of the magnetic flux with respect to time as expressed in equation (1).

Since each ring is a one turn winding, the electromotive force $emf_r$ may be approximated utilizing equation (2) as expressed as follows:

$$emf_r = V_1/N_1 = \tfrac{1}{3} \text{ volt r.m.s.} \qquad (4)$$

When points A on the rings 32A and 32B coincide with the positions of the respective brushes 28A and 28B on the rings, the output voltage between the brushes is equal to the electromotive force $emf_c$ since the rings 32A and 32B do not affect the output voltage. As the drums are rotated to vary the output voltage between the brushes, the points A are displaced from the brushes 28A and 28B responsively to this rotation. As the points A move away from the brushes 28A and 28B, a portion of the electromotive force $emf_r$ related to the angular displacement between the brushes and points A combines with the electromotive force $emf_c$ from the coils 16.

The portion of the total electromotive force $emf_r$ induced into each ring which combines with electromotive force $emf_c$ depends upon the electrical characteristics of the rings 32A and 32B and the displacement between the points A on each ring and the respective brushes 28A and 28B.

As is schematically illustrated in FIG. 3, the rings 32A and 32B have predetermined resistances preferably equal in value between points spaced circumferentially thereof. For example, the resistances $R_1$, $R_2$ and $R_3$ measured between equidistantly spaced points along the circumference of the rings are preferably equal. In the preferred form of the rings 32A and 32B, the rings are constructed from a material having a fairly uniform resistivity and are substantially uniform in cross-section along the circumferential lengths thereof so that the resistance per unit length of each of the rings is uniform.

With this arrangement, the electromotive force $emf_r$ which combines with the electromotive force $emf_c$ varies approximately linearly as a function of drum rotation and may be picked off the rings 32A and 32B with a high degree of accuracy. Thus, a highly accurately selectable output voltage is provided between the brushes 28A and 28B for application to a load $R_L$.

It is apparent that some power loss will occur in the ring due to the induced current $I_r$ flowing through the total ring resistance $R_R$. This power loss $P_R$ is given by the flowing equation:

$$P_R = I_r^2 R_R \qquad (5)$$

Assuming, as in the previous example, that the primary voltage $V_1$ is 120 volts r.m.s. and the number of primary turns is 360, and further assuming that the total resistance $R_R$ of one ring is 0.2 ohms, the power loss $P_R$ in each ring is approximately 0.566 watts. Thus, the ring need only dissipate this small amount of power plus the power loss due to load current flowing through the ring.

The power loss in each of the rings due to load current ($P_L$) with point A located, for example 180° from the brushes 28A and 28B and with a load current of 3 amperes is approximately 0.45 watts. Therefore, the total power loss which the rings must dissipate is slightly over 1 watt under the foregoing load conditions. Thus, by selecting the ring resistance $R_R$ such that the total power loss due to the self-loading and load current is not excessive, the rings are quite readily able to dissipate the heat due to the total power loss.

Figure 4:
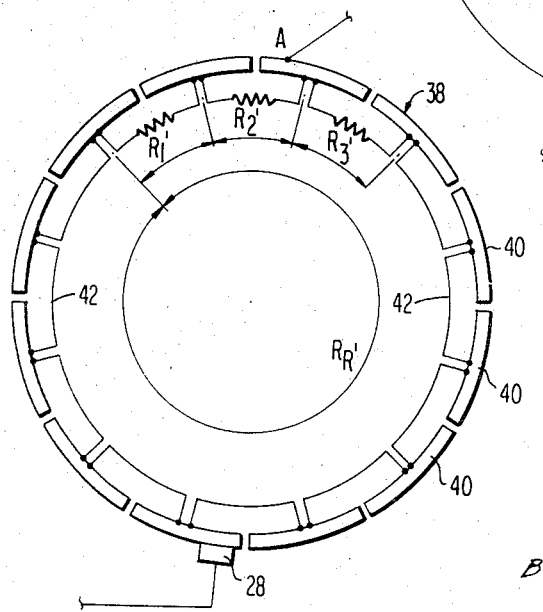
FIG. 4 is a view in elevation functionally illustrating another embodiment of the voltage coupling apparatus of the present invention.

Another embodiment of the self-loading takeoff ring which may be utilized is illustrated in FIG. 4. The ring 38 of FIG. 4 is segmented at predetermined, preferably equal intervals around the circumference there-of to provide a plurality of segments 40 equal in length. Adjacent segments are electrically connected through resistive elements 42 preferably equal in resistance, e.g. a plurality of conductors equal in resistance between the ends thereof, so that a closed electrically conductive loop having a total resistance $R_R'$ is produced.

Each of the segments 40 is preferably constructed from a material having as low a resistivity as practically possible, e.g. copper or silver, so that the segments do not substantially contribute to the total resistivity of the ring irrespective of the position of the brushes on the segments. Thus, as was previously described in connection with FIGS. 2 and 3, the ring constitutes a one turn, closed winding having a predetermined total resistance $R_R'$ and predetermined resistances, approximately equal in value, between points spaced circumferentially along the ring.

The operation of the system utilizing the ring 38 of FIG. 4 is substantially the same as with the rings 32A and 32B. However, it should be noted that the electromotive force $emf_r$ from the ring 38 varies incrementally with the rotation of the drums rather than substantially continuously as with the rings 32A and 32B of FIGS. 2 and 3.

The results obtained utilizing the present invention may be more readily appreciated by those skilled in the art to which the invention pertains from a perusal of the following test results set forth in Tables I and II. The tests were run utilizing the variable inductor essentially as illustrated in FIG. 1 and with a continuous take-off ring of substantially uniform cross section and resistivity as described in connection with FIGS. 1–3. All measurements were taken with a highly accurate Dana Model 3800 Digital Multimeter.

The data of Table I below represents results obtained with a 100 volt r.m.s. input potential ($Ep$) applied to the fixed primary winding, with the induction device thereby operating on the non-linear portion of the core B–H curve. The data of Table II below represents test results obtained with an input voltage of 50 volts r.m.s. applied to the primary winding, with the induction device thereby operating on the linear portion of the core B–H curve.

In both cases, the drums were mounted on a core having a cross-sectional area of 1.5 sq. in. and the drums (and takeoff rings mounted thereon) were rotated through approximately 360° so that the test range approximates one full movable turn being transferred from one drum to the other. Also, the results of Tables I and II were obtained with 400 turns (Np) on the primary winding so that the approximate volt-turn ratio ($V/T = Ep/Np$) in each case was 0.25 V/T (Table I) and 0.125 V/T (Table II). The output voltage ($E_o$) was read between the fixed brushes approximately every 10° for one complete revolution, resulting in the following readings:

TABLE I

| Rotation (Degrees) | $E_o$ (volts r.m.s.) | Rotation (Degrees) | $E_o$ (volts r.m.s.) |
| --- | --- | --- | --- |
| 10° | 0.007 | 190° | 0.125 |
| 20° | 0.13 | 200° | 0.132 |
| 30° | 0.020 | 210° | 0.139 |
| 40° | 0.027 | 220° | 0.146 |
| 50° | 0.033 | 230° | 0.152 |
| 60° | 0.039 | 240° | 0.159 |
| 70° | 0.045 | 250° | 0.165 |
| 80° | 0.052 | 260° | 0.171 |
| 90° | 0.058 | 270° | 0.178 |
| 100° | 0.064 | 280° | 0.185 |
| 110° | 0.071 | 290° | 0.192 |
| 120° | 0.077 | 300° | 0.198 |
| 130° | 0.084 | 310° | 0.206 |
| 140° | 0.090 | 320° | 0.214 |
| 150° | 0.097 | 330° | 0.220 |
| 160° | 0.103 | 340° | 0.226 |
| 170° | 0.110 | 350° | 0.234 |
| 180° | 0.118 | 360° | 0.240 |

TABLE II

| Rotation (Degrees) | $E_o$ volts r.m.s.) | Rotation (Degrees) | $E_o$ (volts r.m.s.) |
| --- | --- | --- | --- |
| 10° | 0.004 | 190° | 0.063 |
| 20° | 0.007 | 200° | 0.666 |
| 30° | 0.010 | 210° | 0.070 |
| 40° | 0.014 | 220° | 0.073 |
| 50° | 0.017 | 230° | 0.077 |
| 60° | 0.021 | 240° | 0.081 |
| 70° | 0.024 | 250° | 0.084 |
| 80° | 0.027 | 260° | 0.086 |
| 90° | 0.030 | 270° | 0.090 |
| 100° | 0.033 | 280° | 0.093 |
| 110° | 0.037 | 290° | 0.097 |
| 120° | 0.040 | 300° | 0.100 |
| 130° | 0.043 | 310° | 0.104 |
| 140° | 0.046 | 320° | 0.107 |
| 150° | 0.050 | 330° | 0.110 |
| 160° | 0.053 | 340° | 0.114 |
| 170° | 0.056 | 350° | 0.118 |
| 180° | 0.060 | 360° | 0.122 |

From the test results of Tables I and II, it can be seen that the selectivity of the output voltage $E_o$ is highly accurate in both test cases. This high degree of accuracy and the accompanying linearity result in very desirable output characteristics for a wide variety of applications.

What is claimed is:

1. In a variable induction device including a source of cyclically varying magnetic flux and movable coil means for generating an output voltage responsively to said cyclically varying magnetic flux, said output voltage being selectively variable in amplitude in response to movement of said movable coil means, apparatus for coupling said output voltage to an external load comprising:
- an electrically conductive ring in flux linking relation with said cyclically varying magnetic flux, the electrical resistance of said ring being substantially uniform between points spaced circumferentially thereof,
- a voltage being developed in and available for coupling from said ring; and,
- electrical contact means in wiping engagement with a relatively small portion of said ring,
- one of said ring and said contact means being movable with and electrically connected to said coil means,
- the other of said ring and said contact means being adapted for electrical connection to said external load,
- the relative positions of the electrical connections to said coil means and said external load being variable in response to movement of said coil means to combine a selectable portion of said developed voltage with said output voltage and provide additional output voltage amplitude selectivity.

2. The apparatus of claim 1 wherein said ring is movable with and electrically connected to said coil means.

3. The apparatus of claim 2 wherein said coil means is mounted on a closed core of magnetic material, and wherein said ring is mounted in mutually encircling relationship with said core.

4. The apparatus of claim 1 wherein said ring is segmented, adjacent of the segments being electrically connected through resistive elements each having substantially the same electrical resistance whereby the electrical resistance between points on adjacent of the segments is substantially equal.

5. The apparatus of claim 4 wherein said segments are highly electrically conductive relative to said resistive elements.

6. The apparatus of claim 1 wherein said ring is continuous and is substantially uniform in cross-section over the circumferential length thereof.

7. The apparatus of claim 6 wherein said ring is movable with and electrically connected to said coil means.

8. The apparatus of claim 7 wherein said coil means is movably mounted on a closed core of magnetic material and wherein said ring is mounted in mutually encircling relationship with said core.

9. The apparatus of claim 6 wherein said coil means comprises two spaced drums each mounted for axial rotation about a magnetic core and a coil wound on said drums, said coil being transferable from one of said drums to the other responsively to the rotation of said drums, said ring being carried by one of said drums for axial rotation therewith about said core, said apparatus further including:
- a second electrically conductive ring carried by the other of said drums for axial rotation therewith about said core in flux linking relation with said cyclically varying magnetic flux, the electrical resistance of said second ring being substantially uniform between points spaced circumferentially thereof; and,
- second electrical contact means in wiping engagement with said second ring,
- said second electrical contact means being electrically connected to said external load,
- said electrically conductive rings being electrically connected to the ends of said transferable coil.

10. In a variable induction device including a magnetic core, two spaced drums each mounted for axial rotation about said core, coil means including a coil wound on said drums and adapted to be selectively transferred from one of said drums to the other in response to axial rotation of said drums, and transformer winding means carried by said core in electrical isolation from said coil means for inducing a cyclically varying magnetic flux in said coil means, said coil means generating an output voltage in response to said magnetic flux, the amplitude of said output voltage being selectively variable in response to axial rotation of said drums, apparatus for coupling said output voltage to a load comprising:
- first and second electrically conductive rings electrically connected, at predetermined positions along said rings, to said coil means and each carried by an associated one of said drums for axial rotation therewith about said core,
- said rings being in flux linking relation with said cyclically varying magnetic flux,
- an electromotive force available for coupling to said load being induced into each of said rings by said cyclically varying magnetic flux; and,
- electrical contact means fixedly mounted adjacent each of said rings in wiping engagement with a relatively small portion thereof,
- said contact means being adapted for electrical connection to said load,
- said predetermined positions along said rings being moved relative to said contact means in response to axial rotation of said drums so that a variable portion of said electromagnetic force induced into said rings is combined with said output voltage as said drums are axially rotated.

11. The apparatus of claim 10 wherein said rings are segmented, adjacent of the segments of each ring being electrically connected through resistive elements each having substantially the same electrical resistance whereby the electrical resistance between points on adjacent of the segments is substantially equal.

12. The apparatus of claim 11 wherein said segments are highly electrically conductive relative to said resistive elements.

13. The apparatus of claim 10 wherein each of said rings is continuous and is substantially uniform in cross-section over the circumferential length thereof.

14. In a variable induction device including a source of cyclically varying magnetic flux in flux linking relation with a movable coil means for generating an output voltage selectively variable in amplitude responsively to movement of said coil means, apparatus for increasing the output voltage amplitude selectively comprising:
an electrically conductive ring in flux linking relation with said cyclically varying magnetic flux, said cyclically varying magnetic flux inducing an electromotive force in said ring substantially equal to the rate of change of the magnetic flux with respect to time; and,
electrical contact means in wiping engagement with said ring,
one of said ring and said contact means being movable with and electrically connected to said coil means,
the other of said ring and said contact means being secured against movement,
at least a portion of said induced electromotive force appearing between a predetermined point on said ring and said contact means and being available for combining with said output voltage from said coil means,
said portion varying in response to movement of said coil means,
said portion combining with said output voltage from said coil means to increase said movement responsive output voltage amplitude selectivity.

15. The apparatus of claim 14 wherein said ring is movable with and electrically connected to said coil means, the electrical resistance between points spaced circumferentially of said ring being substantially uniform.

16. The apparatus of claim 15 wherein said coil mean is mounted on a closed core of magnetic material, and wherein said ring is mounted in mutually encircling relationship with said core.

17. In a variable induction device including a source of cyclically varying magnetic flux and movable coil means for generating an output voltage responsively to said cyclically varying magnetic flux, apparatus for coupling said output voltage to an external load comprising:
an electrically conductive ring in flux linking relation with said cyclically varying magnetic flux,
said ring being segmented with adjacent of the segments being electrically connected through resistive elements each having substantially the same electrical resistance whereby the electrical resistance between points on adjacent of the segments is substantially equal; and,
electrical contact means in wiping engagement with said ring,
one of said ring and said contact means being movable with and electrically connected to said coil means,
the other of said ring and said contact means being adapted for electrical connection to said external load.

18. The apparatus of claim 17 wherein said segments are highly electrically conductive relative to said resistive elements.

19. The apparatus of claim 18 wherein said ring is movable with and electrically connected to said coil means.

20. The apparatus of claim 19 wherein said coil means is movably mounted on a closed core of magnetic material and wherein said ring is mounted in mutually encircling relationship with said core.

21. The apparatus of claim 20 wherein the coil means comprises two spaced drums each mounted for axial rotation about a magnetic core and a coil wound on said drums, said coil being transferable from one of said drums to the other responsively to the rotation of said drums, said ring being carried by one of said drums for axial rotation therewith about said core, said apparatus further including:
a second electrically conductive ring carried by the other of said drums for axial rotation therewith about said core in flux linking relation with said cyclically varying magnetic flux,
said second ring being segmented with adjacent of the segments being electrically connected through resistive elements each having substantially the same electrical resistance whereby the electrical resistance between points on adjacent of the segments is substantially equal; and,
second electrical contact means in wiping engagement with said second ring,
said second electrical contact means being electrically connected to said external load,
said electrically conductive rings being electrically connected to the ends of said transferable coil.

22. In a variable induction device including a magnetic core, two spaced drums each mounted for axial rotation about said core, coil means wound on said drums and adapted to be selectively transferred from one of said drums to the other in response to axial rotation of said drums, and transformer winding means carried by said core in electrical isolation from said coil means for inducing a cyclically varying magnetic flux in said coil means, said coil means generating an output voltage in response to said magnetic flux, the amplitude of said output voltage being variable in response to axial rotation of said drums, apparatus for coupling said output voltage to a load comprising:
first and second electrically conductive rings each carried by an associated one of said drums for axial rotation there-with about said core,
said rings being in flux linking relation with said cyclically varying magnetic flux,
said rings being segmented with adjacent of the segments of each ring being electrically connected through resistive elements each having substantially the same electrical resistance whereby the electrical resistance between points on adjacent of the segments is substantially equal;
an electromotive force being induced into each of said rings by said cyclically varying magnetic flux;
electrical contact means fixedly mounted adjacent each of said rings in wiping contact therewith,
said contact means being adapted for electrical connection to said load.

23. The apparatus of claim 22 wherein said segments are highly electrically conductive relative to said resistive elements.

24. In a variable induction device including a source of cyclically varying magnetic flux in flux linking relation with a movable coil means for generating an output voltage selectively variable in amplitude responsively to movement of said coil means, apparatus for increasing the output voltage amplitude selectivity comprising:

an electrically conductive ring in flux linking relation with said cyclically varying magnetic flux, said cyclically varying magnetic flux inducing an electromotive force in said ring substantially equal to the rate of change of the magnetic flux with respect to time;

said ring being segmented with adjacent of the segments being electrically connected through resistive elements each having substantially the same electrical resistance whereby the electrical resistance between points on adjacent of the segments is substantially equal; and, electrical contact means in wiping engagement with said ring, one of said ring and said contact means being movable with and electrically connected to said coil means, the other of said ring and said contact means being secured against movement, at least a portion of said induced electromotive force appearing between a predetermined point on said ring and said contact means, said portion varying in response to movement of said coil means, said portion combining with said output voltage from said coil means to increase said movement responsive output voltage amplitude selectivity.

25. The apparatus of claim 26 wherein said segments are highly electrically conductive relative to said resistive elements.

* * * * *